(12) United States Patent
Levi et al.

(10) Patent No.: US 11,418,762 B2
(45) Date of Patent: Aug. 16, 2022

(54) IMAGING SYSTEM AND METHOD

(71) Applicant: GM GLOBAL TECHNOLOGY OPERATIONS LLC, Detroit, MI (US)

(72) Inventors: Dan Levi, Kyriat Ono (IL); Emanuel Mordechai, Mishmarot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 17/017,806

(22) Filed: Sep. 11, 2020

(65) Prior Publication Data

US 2022/0086403 A1 Mar. 17, 2022

(51) Int. Cl.
| | |
|---|---|
| *H04N 9/07* | (2006.01) |
| *H04N 5/225* | (2006.01) |
| *G06N 3/02* | (2006.01) |
| *B60W 30/00* | (2006.01) |
| *G06T 3/40* | (2006.01) |
| *H04N 9/04* | (2006.01) |

(52) U.S. Cl.
CPC .............. *H04N 9/07* (2013.01); *B60W 30/00* (2013.01); *G06N 3/02* (2013.01); *G06T 3/4038* (2013.01); *H04N 5/2254* (2013.01); *H04N 9/04557* (2018.08); *B60W 2420/42* (2013.01)

(58) Field of Classification Search
CPC .... H04N 5/2254; H04N 9/07; H04N 9/04557; B60W 30/00; B60W 2420/42; G06T 3/4038; G06K 9/00798; G06V 20/56; G06V 10/56; G06V 10/58; G06V 10/70; G06V 10/764; G06V 10/82; G06V 20/588
See application file for complete search history.

(56) References Cited

U.S. PATENT DOCUMENTS

| | | | | |
|---|---|---|---|---|
| 9,589,195 | B2* | 3/2017 | Aycock | G06V 40/166 |
| 10,395,113 | B2* | 8/2019 | Aycock | G01V 8/10 |
| 10,421,459 | B2* | 9/2019 | Goldman-Shenhar | B60W 50/14 |
| 10,482,576 | B2* | 11/2019 | Liu | G06T 3/4061 |
| 10,572,742 | B2* | 2/2020 | Hoare | G06V 20/56 |
| 10,659,751 | B1* | 5/2020 | Briggs | G06V 30/194 |
| 11,127,147 | B2* | 9/2021 | Mordechai | G05D 1/0221 |
| 2011/0058038 | A1* | 3/2011 | Twede | H04N 9/0451 348/148 |
| 2016/0307053 | A1* | 10/2016 | Aycock | G06V 40/172 |

(Continued)

FOREIGN PATENT DOCUMENTS

| | | | | |
|---|---|---|---|---|
| WO | WO-2019156731 | A1 * | 8/2019 | G06K 9/00791 |
| WO | WO-2021154459 | A1 * | 8/2021 | |
| WO | WO-2021209872 | A1 * | 10/2021 | |

OTHER PUBLICATIONS

Arad et al. "Sparse recovery of hyperspectral signal from natural RGB images" European Conference on Computer Vision (Oct. 2016) pp. 19-34.

*Primary Examiner* — John Villecco
(74) *Attorney, Agent, or Firm* — Cantor Colburn LLP (57) ABSTRACT

A system and method may include capturing a multi-channel polarimetric image and a multi-channel RGB image of a scene by a color polarimetric imaging camera. A multi-channel hyperspectral image may be synthesized from the multi-channel RGB image and concatenated with the multi-channel polarimetric image to create an integrated polarimetric-hyperspectral image. Scene properties within the integrated polarimetric-hyperspectral image may be disentangled.

19 Claims, 4 Drawing Sheets

(56) References Cited

U.S. PATENT DOCUMENTS

| | | | |
|---|---|---|---|
| 2018/0005012 A1* | 1/2018 | Aycock | G02B 5/201 |
| 2020/0182988 A1* | 6/2020 | Pau | G01S 7/4814 |
| 2021/0084284 A1* | 3/2021 | McEldowney | H04N 13/344 |
| 2021/0264169 A1* | 8/2021 | Speigle | H04N 5/2351 |
| 2022/0020178 A1* | 1/2022 | Metzler | G06T 5/50 |

\* cited by examiner

IMAGING SYSTEM AND METHOD

INTRODUCTION

This disclosure is related to situational awareness and automated vehicle control.

Imaging systems are known to monitor the region surrounding a vehicle for improving situational awareness. Such systems may provide scene reconstruction, including object and clear path determinations, providing such determinations for operator alerts and use as control inputs. Such systems may be useful in vehicle controls ranging from full operator control to full autonomous control. Vehicles may include various advanced driver-assistance systems (ADAS) which may control some or all aspects of vehicle navigational dynamics in response to inputs from such imaging systems.

Imaging systems may provide scene discrimination and object classification. Scene depth information may be provided by time of flight measurements, such as by radio detection and ranging (RaDAR) and light detection and ranging (LiDAR) systems. However, RaDAR and LiDAR systems may have limited spatial resolution when compared to imaging systems. Thus, combining information from both types of systems where there is spatial information mismatch is challenging. Color polarimetric imaging devices are known which provide combined color and polarimetric information at equivalent imaging system spatial resolutions. Color polarimetric imaging may enable improvements in combined scene discrimination, object classification and depth. However, such imaging devices provide scene property information that is substantially tangled and hence difficult to extract.

SUMMARY

In one exemplary embodiment, an apparatus may a color polarimetric imaging camera providing a multi-channel polarimetric image of a scene. The color polarimetric imaging camera may also provide a multi-channel RGB image of the scene. A processor may be adapted to receive the multi-channel polarimetric image and the multi-channel RGB image from the color polarimetric imaging camera and may be configured to synthesize a multi-channel hyperspectral image from the multi-channel RGB image, concatenate the multi-channel polarimetric image and the multi-channel hyperspectral image to create an integrated polarimetric-hyperspectral image, and disentangle scene properties within the integrated polarimetric-hyperspectral image.

In addition to one or more of the features described herein, disentangling scene properties within the integrated polarimetric-hyperspectral image may include extracting individual scene properties from the integrated polarimetric-hyperspectral image.

In addition to one or more of the features described herein, disentangling scene properties within the integrated polarimetric-hyperspectral image may include receiving the integrated polarimetric-hyperspectral image at an input layer of a trained neural network, and extracting individual scene properties from the integrated polarimetric-hyperspectral image through the trained neural network.

In addition to one or more of the features described herein, disentangling scene properties within the integrated polarimetric-hyperspectral image may include receiving the integrated polarimetric-hyperspectral image at an input layer of a trained neural network, an generating a depth mapped spatial image through the trained neural network.

In addition to one or more of the features described herein, the individual scene properties may include illumination, material and surface orientation.

In addition to one or more of the features described herein, synthesizing a multi-channel hyperspectral image from the multi-channel RGB image may include a sparse application of an overcomplete dictionary technique.

In addition to one or more of the features described herein, the multi-channel polarimetric image, the multi-channel RGB image, and the multi-channel hyperspectral image may include spatial identity.

In another exemplary embodiment, a method may include capturing a multi-channel polarimetric image and a multi-channel RGB image of a scene by a color polarimetric imaging camera, synthesizing a multi-channel hyperspectral image from the multi-channel RGB image by a processor, concatenating the multi-channel polarimetric image and the multi-channel hyperspectral image to create an integrated polarimetric-hyperspectral image by the processor, and disentangling scene properties within the integrated polarimetric-hyperspectral image.

In addition to one or more of the features described herein, disentangling scene properties within the integrated polarimetric-hyperspectral image may include extracting individual scene properties from the integrated polarimetric-hyperspectral image.

In addition to one or more of the features described herein, disentangling scene properties within the integrated polarimetric-hyperspectral image may include receiving the integrated polarimetric-hyperspectral image at an input layer of a trained neural network, and extracting individual scene properties from the integrated polarimetric-hyperspectral image through the trained neural network.

In addition to one or more of the features described herein, disentangling scene properties within the integrated polarimetric-hyperspectral image may include receiving the integrated polarimetric-hyperspectral image at an input layer of a trained neural network, an generating a depth mapped spatial image through the trained neural network.

In addition to one or more of the features described herein, the individual scene properties may include illumination, material and surface orientation.

In addition to one or more of the features described herein, synthesizing a multi-channel hyperspectral image from the multi-channel RGB image may include a sparse application of an overcomplete dictionary technique.

In addition to one or more of the features described herein, the multi-channel polarimetric image, the multi-channel RGB image, and the multi-channel hyperspectral image may include spatial identity.

In yet another exemplary embodiment, a method may include capturing a multi-channel polarimetric image and a multi-channel RGB image of a scene exterior of a vehicle by a color polarimetric imaging camera on the vehicle, synthesizing a multi-channel hyperspectral image from the multi-channel RGB image by a processor, concatenating the multi-channel polarimetric image and the multi-channel hyperspectral image to create an integrated polarimetric-hyperspectral image by the processor, receiving the integrated polarimetric-hyperspectral image at an input layer of a trained neural network by the processor, at least one of (i) extracting individual scene properties from the integrated polarimetric-hyperspectral image through the trained neural network by the processor, and (ii) generating a depth mapped spatial image through the trained neural network by the processor, and performing a vehicle control operation to control the vehicle in response to at least one of scene properties and depth mapped spatial images.

In addition to one or more of the features described herein, the individual scene properties may include illumination, material and surface orientation.

In addition to one or more of the features described herein, the depth mapped spatial images comprise depth channel images and multi-channel RGB images.

In addition to one or more of the features described herein, synthesizing a multi-channel hyperspectral image from the multi-channel RGB image may include a sparse application of an overcomplete dictionary technique.

In addition to one or more of the features described herein, the multi-channel polarimetric image, the multi-channel RGB image, and the multi-channel hyperspectral image may include spatial identity.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuits (ASIC), electronic circuits, central processing units (preferably microprocessors) and associated memory and storage (read only memory (ROM), random access memory (RAM), electrically programmable read only memory (EPROM), hard drive, etc.), graphic processing units, or microcontrollers executing one or more software or firmware programs or routines, combinational logic circuits, input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 1:
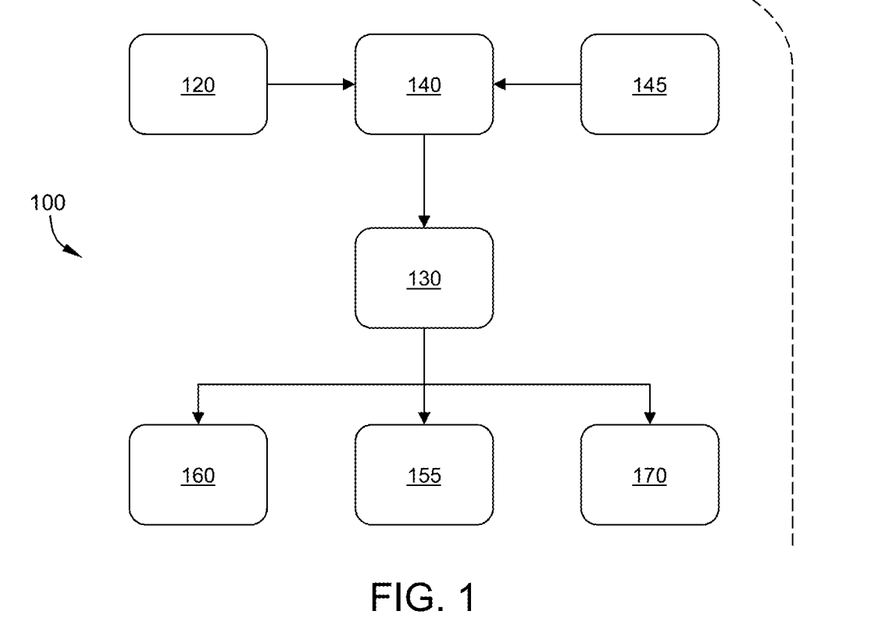
FIG. 1 illustrates an exemplary system for sensing the environment in the vicinity of a vehicle and controlling the vehicle navigational dynamics, in accordance with the present disclosure.

Turning now to FIG. 1, a block diagram illustrates an exemplary system 100 for sensing the environment in the vicinity of a vehicle and controlling the vehicle navigational dynamics in response thereto. System 100 may include vehicle 101, a processor 140, a color polarimetric camera 120, a memory 145, a vehicle controller 130, a throttle controller 155, a brake controller 160 and a steering controller 170. Processor 140 may be a graphics processing unit. The vehicle controller 130 may generate control signals for coupling to other vehicle system controllers, such as a throttle controller 155, a brake controller 160 and a steering controller 170 in order to control the operation of the vehicle in accordance with ADAS controls. The vehicle controller 130 may be operative to adjust the speed of the vehicle via the throttle controller 155 or to apply the friction brakes via the brake controller 160 in response to inputs generated by the processor 140, for example depth mapped spatial images. The vehicle controller 130 may be operative to adjust the direction of the vehicle controlling the vehicle steering via the steering controller 170 in response to inputs generated by the processor 140.

The system 100 may utilize the color polarimetric camera 120, among other sensors, to detect objects in proximity to the vehicle. Sensor fusion may be performed to provide accurate detection, classification, tracking, etc. of external objects as well as calculation of appropriate attributes such as relative velocities, accelerations, and the like. The color polarimetric camera 120 is operative to capture an image within a field of view (FOV) which may include static and dynamic objects within that FOV. Image processing techniques may be used to locate and classify objects within the FOV. The FOV generally correlates to the driving scene or portion of the driving scene as limited by the FOV.

The color polarimetric camera 120 may be operative to capture an image, or a series of images of a field of view proximate to the vehicle 101. The series of images may be used to generate a video or the like of the field of view over time. The color polarimetric camera 120 may be operative to passively collect polarimetric data and may be equipped with a polarization array layer over a common color filter array (CFA) (Bayer filter). In an exemplary embodiment, the polarimetric camera 120 may be operative to collect 0°, 45°, 90° and 135° polarization angle data for each of four quadrant colors (RGGB) of the common color filter array.

Thus, in this exemplary embodiment, the color polarimetric camera 120 may provide 16 different polarization values per calculation unit. In this exemplary embodiment, the processor 140 may be operative to receive, from the color polarimetric camera 120, the raw polarization angle data ($I_0$, $I_{45}$, $I_{90}$, and $I_{135}$) from each of the color quadrants (RGGB) of the common color filter array of the color polarimetric camera 120. In addition, the processor 140 may receive red, green and blue (RGB) light information from each of the color quadrants (RGGB) of the common color filter array of the color polarimetric camera 120. Thus, in the exemplary embodiment, the electromagnetic radiation from the field of view proximate to the vehicle is captured by the polarimetric camera 120 as color and polarization data for each pixel and is coupled to the processor 140. The digitized raw data output from the polarimetric camera 120 may include seven information channels where three channels are RGB color channels and four channels are polarization channels.

Figure 2:
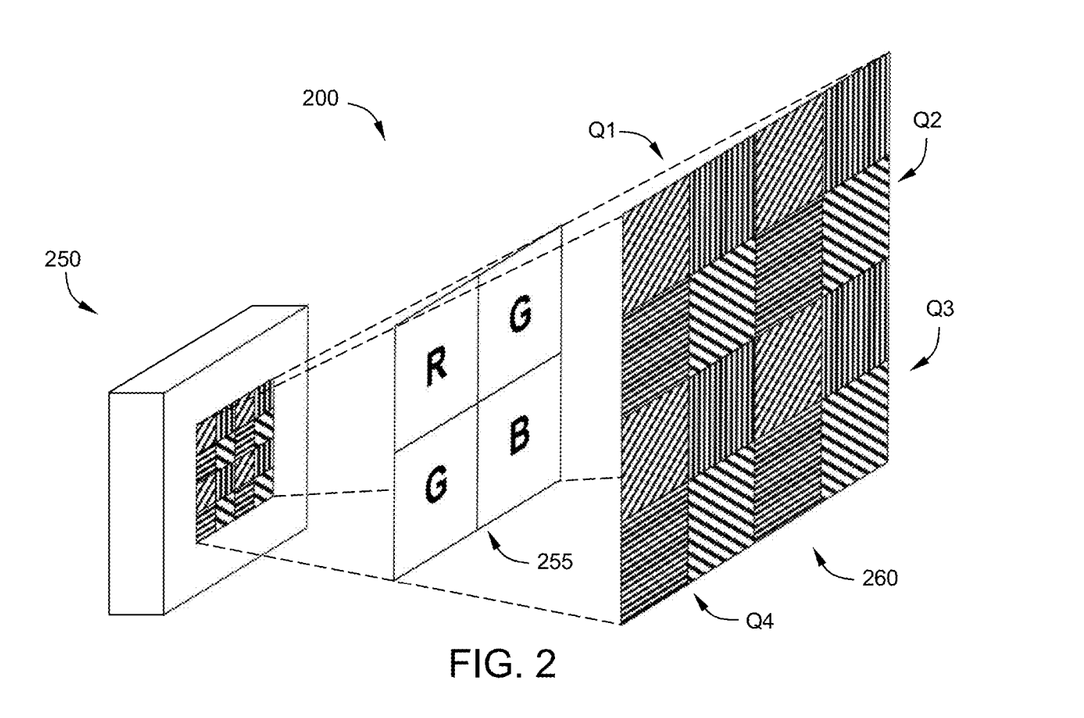
FIG. 2 shows an arrangement of a 4×4 (16 pixel) calculation unit including a polarizer array layer and common color filter array of an exemplary color polarimetric camera sensor, in accordance with the present disclosure.
Figure 3:
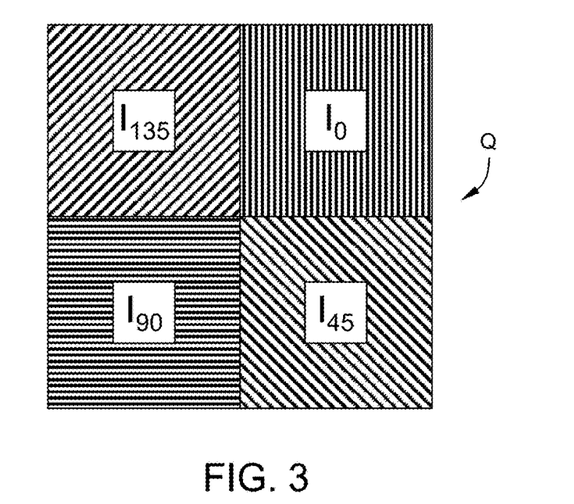
FIG. 3 shows a 2×2 (4 pixel) calculation unit of an exemplary color polarimetric camera sensor, in accordance with the present disclosure.
Figure 4:
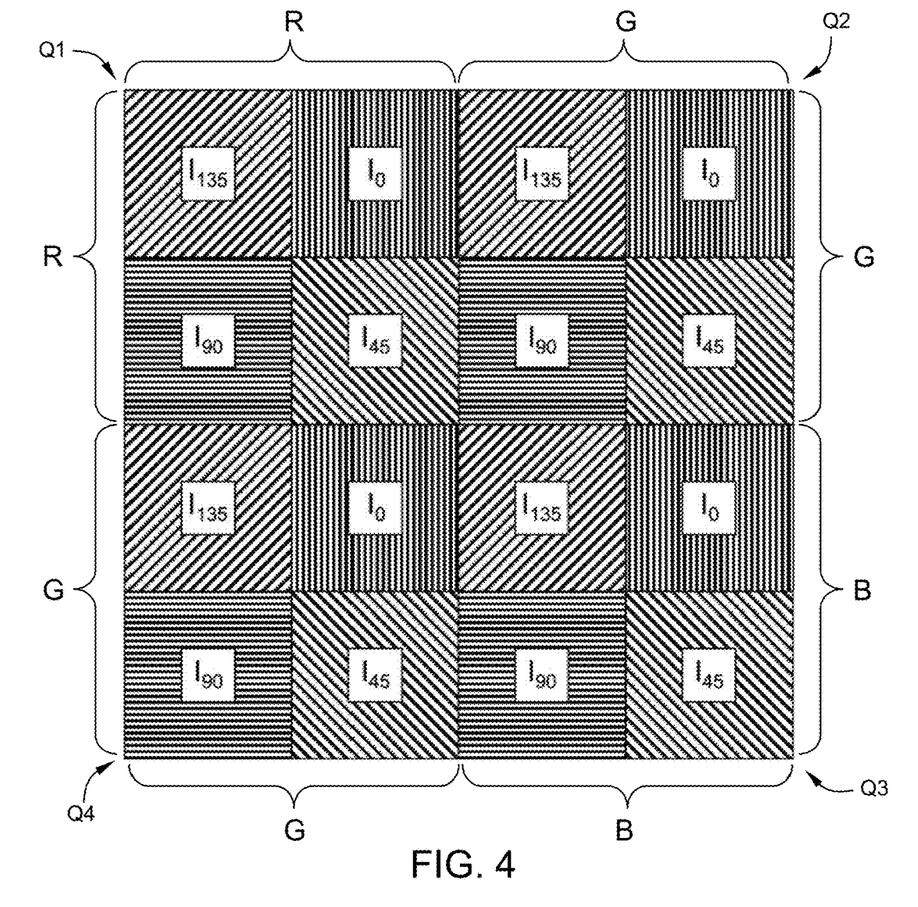
FIG. 4 shows a view of a 4×4 (16 pixel) calculation unit of an exemplary color polarimetric camera sensor, in accordance with the present disclosure.

Turning now to FIGS. 2, 3 and 4, an exemplary color polarimetric camera sensor 250 may include a polarizer array layer 260 made of nanowire-grid patterns placed on the focal-plane-array (FPA) above a photodiode layer. The polarizer array layer 260 could be inherently implemented as part of the sensor fabrication process. Alternatively, the polarizer array layer 260 could be designed and manufactured and then applied to the FPA. FIG. 2 illustrates one 4×4 (16 pixel) calculation unit of color polarimetric camera sensor 250, it being understood that color polarimetric camera sensor 250 includes a plurality of such calculation units in accordance with the desired resolution of the color polarimetric camera 120.

In order to measure light color intensity (i.e., red, green, blue (RGB) data) as well as polarimetric data, the polarizer array layer 260 may be implemented on top of a common color filter array 255. Each of the color quadrants (RGGB) of the CFA 255 may correspond to a 2×2 (4 pixel) calculation unit Q (FIG. 3) wherein each pixel corresponds to a respective one of the four polarization angles 0°, 45°, 90° and 135° of the polarizer array layer 260. In an exemplary embodiment, four 2×2 (4 pixel) calculation units (Q1, Q2, Q3, Q4), each corresponding to a respective one of the four color quadrants (RGGB) of the CFA, are used to form a 4×4 (16 pixel) calculation unit (FIG. 4).

FIG. 3 illustrates an exemplary 2×2 (4 pixel) calculation unit Q allowing measurement of three Stokes parameters (denoted S0, S1, S2) and derivation of Angle of Linear Polarization (AoLP) and Degree of Linear Polarization (DoLP). In this example, the polarization data is calculated independently for each color of the four colors of the CFA and the camera output is a scene image with five channels: R, G, B, AoLP, and DoLP. Thus the raw data received from each of the angled polarizers, $I_0$, $I_{45}$, $I_{90}$, and $I_{135}$ are used to determine the Stokes parameters $S_0$, $S_1$, $S_2$ according to EQS. 1-3.

$$S_0 = I_0 + I_{90} = I_{45} + I_{135} \quad [1]$$

$$S_1 = I_0 - I_{90} \quad [2]$$

$$S_2 = I_{45} - I_{135} \quad [3]$$

In turn, the stokes parameters may be used to generate a camera output of a field of view image with 3 channels: Intensity, AoLP, and DoLP according to EQS. 4 and 5.

$$DoLP = 2\frac{\sqrt{s_1^2 + s_2^2}}{s_0} \in [0, 1] \quad [4]$$

$$AoLP = 0.5 \tan^{-1}\left(\frac{s_2}{s_1}\right) \in [0° \dots 180°] \quad [5]$$

Figure 5:
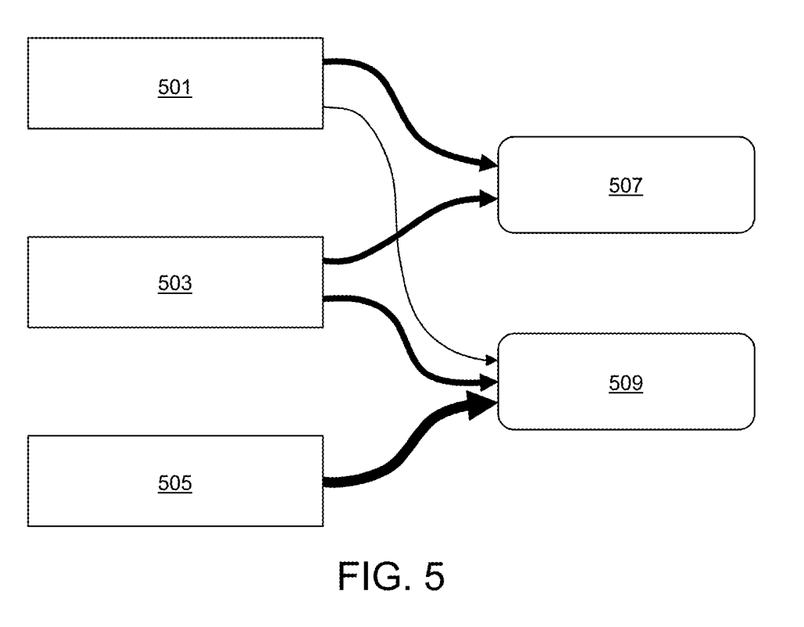
FIG. 5 illustrates a graphical representation of the complex data sets accounting for the image properties influencing hyperspectral and polarimetric images, in accordance with the present disclosure.

FIG. 5 illustrates, on the left, well-known scene properties of illumination 501, material 503 and surface orientation 505. On the right, hyperspectral imaging 507 and polarimetric imaging 509 are represented. Illumination 501 is known to materially influence both hyperspectral imaging 507 and polarimetric imaging 509 as shown. Material 503 is also known to materially influence both hyperspectral imaging 507 and polarimetric imaging 509 as shown. However, surface orientation is known to materially influence only polarimetric imaging 509 but not hyperspectral imaging 507 as shown. Further, the relative influence of each scene property 501-505 is exemplified in the relative weights of the connecting arrows as illustrated. Thus, it is appreciated that hyperspectral imaging 507 is influenced relatively equally by the scene properties of illumination 501 and material 503, whereas polarimetric imaging 509 is influenced by the scene property of material 503 substantially equivalent to its influence upon hyperspectral imaging 507, to a relatively lesser degree by the scene property of illumination 501 and to a relatively greater degree by the scene property of surface orientation 505. FIG. 5 represents a simplistic, graphical representation of the complex data sets accounting for the scene properties influencing hyperspectral and polarimetric images.

Figure 6:
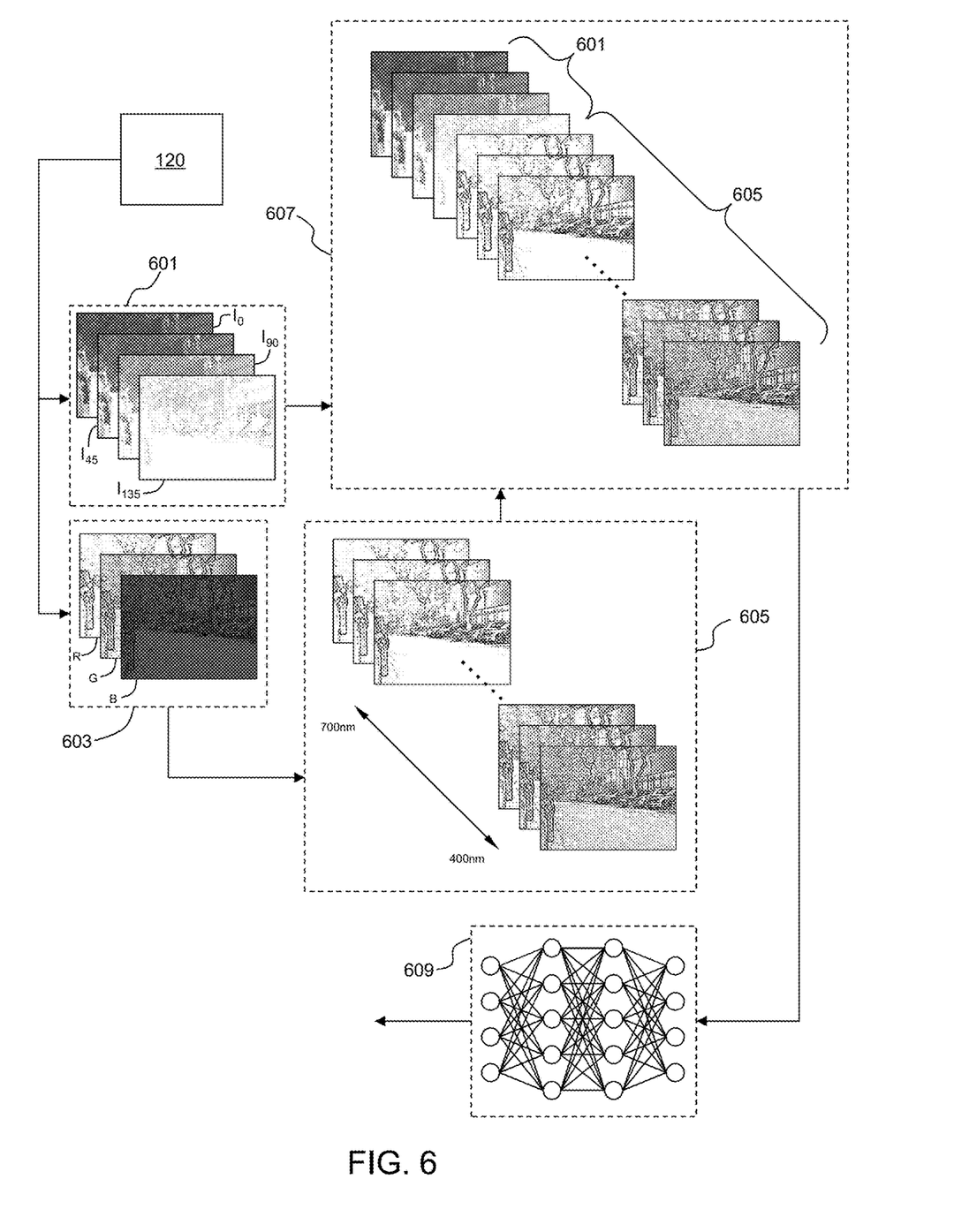
FIG. 6 illustrates an exemplary process for generating a depth mapped spatial image from a single color polarimetric camera, in accordance with the present disclosure.

FIG. 6, in accordance with one embodiment, illustrates an exemplary process for generating a depth mapped spatial image from a single color polarimetric camera 120. The process may be executed by processor 140 (FIG. 1). The color polarimetric camera 120 provides a multi-channel polarimetric image 601 of the scene within the field of view of the camera. Multi-channel polarimetric image 601 in the present embodiment includes four channels of polarimetric information, one for each of the raw polarization data ($I_0$, $I_{45}$, $I_{90}$, and $I_{135}$). Each channel of the multi-channel polarimetric image 601 occupies the same spatial dimensions corresponding to the resolution of the color polarimetric camera 120. Color polarimetric camera 120 also provides a multi-channel RGB image 603 of the scene within the field of view of the camera. Multi-channel RGB image 603 in the present embodiment includes three channels of color information, one for each of the RGB colors. Each channel of the multi-channel RGB image 603 occupies the same spatial dimensions corresponding to the resolution of the color polarimetric camera 120. In accordance with the present disclosure, a multi-channel hyperspectral image 605 is synthesized from the RGB image 603. Each channel of the multi-channel hyperspectral image 605 occupies the same spatial dimensions corresponding to the resolution of the color polarimetric camera 120. Each channel of the multi-channel polarimetric image 601, the multi-channel RGB image 603 and the multi-channel hyperspectral image 605 may be saved into memory 145, and advantageously may be stored as arrays of equivalent spatial identity. Thus, it is appreciated that the multi-channel polarimetric image 601, the multi-channel RGB image 603, and the multi-channel hyperspectral image 605 share spatial identity.

It is known that each pixel of the RGB image 603 may be sampled at a plurality of spectral points or regions, for example 100, from within a predetermined range of frequencies or wavelengths of interest, for example, within a visible spectrum from about 400 nm to about 700 nm. From each pixel, therefore, may be extracted a 100-dimension vector wherein each dimension is a different spectral point or region. Thus, each pixel RGB may be represented by a 100-dimension vector. However, it has been recognized that while the entire spectrum may require representation by, for example, a high (e.g. 100) dimensional space, a much lower dimensional space (e.g. 3-8) is actually required to satisfactorily represent each pixel. Therefore, in one embodiment, an overcomplete dictionary of 100-dimension vectors may be built and each actual RGB point may have a sparse linear combination of only several of these vectors. The overcomplete dictionary enforces sparseness on the representation. From this, an RGB projection—going from 100 dimensions to, for example, 3-8 dimensions—is a simple deterministic function. Given a new RGB image from the color polarimetric camera 120, coefficients of the dictionary after it was projected to RGB can be determined to return a sparse representation in the dictionary of a minimal linear combination of several ones of the entire plurality of vectors. The hyperspectral image may thus be synthesized with a linear combination of the vectors at each pixel in the image. The foregoing represents but one known technique, referred to as a sparse application of an overcomplete dictionary technique, known to those skilled in the art to reconstruct a multi-channel hyperspectral image from an RGB image.

Subsequent to synthesizing the multi-channel hyperspectral image 605, the spatial identity of the multi-channel polarimetric image 601 and the multi-channel hyperspectral image 605 allows for simple linear concatenation of all channels of the respective images (601, 605) into an integrated image 607. The integrated image may next be input to downstream processing 609 to disentangle the underlying illumination, material and surface orientation scene properties. Such processing and disentanglement may further enhance the ability to independently sense and utilize each of the scene properties. Thus, in addition to full three-dimensional perception of a scene, object or feature, material may be distinguishable. For example, a preceding road patch feature may be distinguished as black ice vs. paper debris, which distinction may be relevant to operator notifications and/or ADAS functions. In one embodiment, downstream processing may include a trained deep neural network to generate a depth mapped spatial image. In one embodiment, processor 140 may employ a convolutional encoder-decoder to transform integrated image information into depth mapped spatial images. For example, the encoder may include several layers, each containing convolution filters of various sizes, pooling blocks, normalization blocks, and a non-linear activation function. Each layer may output a set of feature maps, also known as channels. The encoder may receive the integrated image and generate a low dimension representation. The decoder may reverse the encoder's operation and may also include multiple layers, each containing convolution, pooling, normalization, and a non-linear activation function. There may be connections between layers in the encoder and corresponding layers in the decoder. In one exemplary embodiment, the encoder-decoder architecture may resemble a U-net convolutional network for image segmentation. The network input may include integrated images with a predetermined number of total channels including channels of hyperspectral data and channels of polarization data. The network output may include a single channel representing spatially accurate depth at the pixel level in a depth channel image. Alternatively, or additionally, the network output may include one or more additional channels representing spatially accurate metrics of independent scene properties, for example illumination, material and surface orientation in respective scene property images. Alternatively, or additionally, multiple networks may independently output respective channels representing spatially accurate metrics of depth, illumination, material and surface orientation. Downstream processing 609 may also include reintegration of various image channels, for example concatenation of a depth channel image from the network and the RGB channels of the raw RGB image to generate a depth mapped spatial image. Other additional channels, for example one or more of an illumination channel image, a material channel image or a surface orientation channel image, may integrate with such depth mapped spatial images. Such multi-channel spatial images and/or independent channels of spatially accurate metrics of independent scene properties may provide input to vehicle controller 130 for use with ADAS controls.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus, comprising:
a color polarimetric imaging camera providing a multi-channel polarimetric image of a scene;
the color polarimetric imaging camera providing a multi-channel RGB image of the scene;
a processor adapted to receive the multi-channel polarimetric image and the multi-channel RGB image from the color polarimetric imaging camera and configured to:
synthesize a multi-channel hyperspectral image from the multi-channel RGB image;
concatenate the multi-channel polarimetric image and the multi-channel hyperspectral image to create an integrated polarimetric-hyperspectral image; and
disentangle scene properties within the integrated polarimetric-hyperspectral image.

2. The apparatus of claim 1, wherein disentangling scene properties within the integrated polarimetric-hyperspectral image comprises extracting individual scene properties from the integrated polarimetric-hyperspectral image.

3. The apparatus of claim 1, wherein disentangling scene properties within the integrated polarimetric-hyperspectral image comprises:
receiving the integrated polarimetric-hyperspectral image at an input layer of a trained neural network; and
extracting individual scene properties from the integrated polarimetric-hyperspectral image through the trained neural network.

4. The apparatus of claim 3, wherein the individual scene properties comprise illumination, material and surface orientation.

5. The apparatus of claim 1, wherein disentangling scene properties within the integrated polarimetric-hyperspectral image comprises:
receiving the integrated polarimetric-hyperspectral image at an input layer of a trained neural network; and
generating a depth mapped spatial image through the trained neural network.

6. The apparatus of claim 1, wherein synthesizing a multi-channel hyperspectral image from the multi-channel RGB image comprises a sparse application of an overcomplete dictionary technique.

7. The apparatus of claim 1, wherein the multi-channel polarimetric image, the multi-channel RGB image, and the multi-channel hyperspectral image comprise spatial identity.

8. A method, comprising:
capturing a multi-channel polarimetric image and a multi-channel RGB image of a scene by a color polarimetric imaging camera;
synthesizing a multi-channel hyperspectral image from the multi-channel RGB image by a processor;
concatenating the multi-channel polarimetric image and the multi-channel hyperspectral image to create an integrated polarimetric-hyperspectral image by the processor; and
disentangling scene properties within the integrated polarimetric-hyperspectral image.

9. The method of claim 8, wherein disentangling scene properties within the integrated polarimetric-hyperspectral image comprises extracting individual scene properties from the integrated polarimetric-hyperspectral image.

10. The method of claim 8, wherein disentangling scene properties within the integrated polarimetric-hyperspectral image comprises:
receiving the integrated polarimetric-hyperspectral image at an input layer of a trained neural network; and
extracting individual scene properties from the integrated polarimetric-hyperspectral image through the trained neural network.

11. The method of claim 10, wherein the individual scene properties comprise illumination, material and surface orientation.

12. The method of claim 8, wherein disentangling scene properties within the integrated polarimetric-hyperspectral image comprises:
receiving the integrated polarimetric-hyperspectral image at an input layer of a trained neural network; and
generating a depth mapped spatial image through the trained neural network.

13. The method of claim 8, wherein synthesizing a multi-channel hyperspectral image from the multi-channel RGB image comprises a sparse application of an overcomplete dictionary technique.

14. The method of claim 8, wherein the multi-channel polarimetric image, the multi-channel RGB image, and the multi-channel hyperspectral image comprise spatial identity.

15. A method, comprising:
capturing a multi-channel polarimetric image and a multi-channel RGB image of a scene exterior of a vehicle by a color polarimetric imaging camera on the vehicle;
synthesizing a multi-channel hyperspectral image from the multi-channel RGB image by a processor;
concatenating the multi-channel polarimetric image and the multi-channel hyperspectral image to create an integrated polarimetric-hyperspectral image by the processor;
receiving the integrated polarimetric-hyperspectral image at an input layer of a trained neural network by the processor;
at least one of (i) extracting individual scene properties from the integrated polarimetric-hyperspectral image through the trained neural network by the processor, and (ii) generating depth mapped spatial images through the trained neural network by the processor; and
performing a vehicle control operation to control the vehicle in response to at least one of scene properties and depth mapped spatial images.

16. The method of claim 15, wherein the individual scene properties comprise illumination, material and surface orientation.

17. The method of claim 15, wherein the depth mapped spatial images comprise depth channel images and multi-channel RGB images.

18. The method of claim 15, wherein synthesizing a multi-channel hyperspectral image from the multi-channel RGB image comprises a sparse application of an overcomplete dictionary technique.

19. The method of claim 15, wherein the multi-channel polarimetric image, the multi-channel RGB image, and the multi-channel hyperspectral image comprise spatial identity.

* * * * *